(12) United States Patent
Mun et al.

(10) Patent No.: US 8,514,806 B2
(45) Date of Patent: Aug. 20, 2013

(54) APPARATUS AND METHOD FOR AUTOMATICALLY SETTING A CONFIGURATION OF A HOME BASE STATION

(75) Inventors: Seung-Cheol Mun, Seongnam-si (KR); Suk-Kyun Hur, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1061 days.

(21) Appl. No.: 12/073,272

(22) Filed: Mar. 3, 2008

(65) Prior Publication Data

US 2008/0212554 A1 Sep. 4, 2008

(30) Foreign Application Priority Data

Mar. 2, 2007 (KR) .................. 10-2007-0021079
Jul. 26, 2007 (KR) .................. 10-2007-0075154

(51) Int. Cl.
*H04W 4/00* (2009.01)

(52) U.S. Cl.
USPC ........... 370/331; 370/338; 370/343; 455/436; 455/445; 455/561

(58) Field of Classification Search
None
See application file for complete search history.

(56) References Cited

U.S. PATENT DOCUMENTS

| 7,299,069 B2 * | 11/2007 | Claussen ..................... 455/561 |
| 2003/0109254 A1 * | 6/2003 | Motegi et al. ................ 455/435 |
| 2003/0129980 A1 * | 7/2003 | Sayeedi ....................... 455/435 |
| 2006/0128423 A1 * | 6/2006 | Horvath et al. ............ 455/552.1 |

FOREIGN PATENT DOCUMENTS

| CN | 1894979 | 1/2007 |
| WO | WO 2005015917 A2 * | 2/2005 |

OTHER PUBLICATIONS

Chinese Office Action dated Dec. 31, 2010 issued with regard to Chinese Patent Application No. 200810080699.1, which corresponds to U.S. Appl. No. 12/073,272.

* cited by examiner

*Primary Examiner* — Ian N Moore
*Assistant Examiner* — Brian T Le
(74) *Attorney, Agent, or Firm* — H.C. Park & Associates, PLC

(57) ABSTRACT

An apparatus and method for automatically setting a configuration in a home base station. In the method for automatically setting a configuration in a home base station, wireless setting information of a neighbor base station and a neighbor home base station is retrieved through a communication interface for a terminal operation when updated wireless setting information is not received from a network apparatus. The retrieved wireless setting information is transmitted to the network apparatus. An operation is performed by reflecting last wireless setting information when the last wireless setting information is received from the network apparatus. The configuration can be automatically set by monitoring an environment of a neighbor base station without a direct operation of an engineer, transmitting a monitoring result to a server, and receiving FA information and PN code information from the server.

35 Claims, 8 Drawing Sheets

APPARATUS AND METHOD FOR AUTOMATICALLY SETTING A CONFIGURATION OF A HOME BASE STATION

CLAIM OF PRIORITY

This application makes reference to, incorporates the same herein, and claims all benefits accruing under 35 U.S.C. §119 from applications earlier filed in the Korean Intellectual Property Office on 2 Mar. 2007 and there duly assigned Serial No. 2007-0021079, and on 26 Jul. 2007 and there duly assigned Serial No. 2007-0075154, respectively.

BACKGROUND OF THE INVENTION

1. Field of the Invention

The present invention relates to a technology in which a home base station independently acquires and sets frequency assignment (FA) information and pseudo noise (PN) code (or unique code) information of a neighbor base station from a server without directly assigning FA information and PN code information to the home base station to be installed by an engineer in an actual field when a provider initially installs the home base station or additionally installs the home base station in a hot spot or a shadow area while a mobile communication network operates.

2. Description of the Related Art

A home base station should detect FA information and PN code channel information of a neighbor base station for non-overlapping PN assignment and handoff.

At this time, an operation provider should allow an engineer to directly assign FA information, PN codes, and the like by directly monitoring communication with a terminal in the field using base station and home base station installation situation data.

Moreover, in the home base station, only a transmission/reception path dedicated for the base station for communicating with the terminal and a modem dedicated for the base station are present.

A structure of the home base station is as follows.

FIG. 1 illustrates a configuration of a communication interface in a conventional home base station.

Referring to FIG. 1, the communication interface includes a modem 110, an upconverter 120, a digital to analog converter (DAC) 125, a transmitter 130, an amplifier 135, a filter 140, an antenna 145, a downconverter 160, an analog to digital converter (ADC) 155, and a receiver 150.

Upon transmission, a signal modulated through the modem 110 passes through the upconverter 120 and is converted into an analog signal in the DAC 125. The signal passes through the transmitter 130 and is amplified in the amplifier 135. The signal is filtered in the filter 140 and is transmitted through the antenna 145.

Upon reception, a signal received through the antenna 145 is filtered in the filter 140 and passes through the receiver 150. The signal is converted into a digital signal in the ADC 155. The signal passes through the downconverter 160 and is demodulated in the modem 110.

As illustrated in FIG. 1, only the transmission/reception path dedicated for the home base station is present in the home base station.

Accordingly, the environment of a neighbor base station and a neighbor home base station should be monitored through a diagnosis monitoring process with an actual terminal so as to detect FA information and unique code information of PN codes of the neighbor base station and the neighbor home base station, such that setting values should be directly assigned by an engineer. However, there is a problem in that an automatic configuration of the home base station is impossible.

SUMMARY OF THE INVENTION

The present invention has been made to solve the foregoing problems of the prior art and therefore the present invention provides an apparatus and method for automatically setting a configuration in a home base station.

Moreover, the present invention provides an apparatus and method for acquiring FA information and unique code information of PN codes and automatically setting a configuration by adding a terminal operation reception communication interface to an existing home base station without direct involvement of an engineer.

According to a first aspect of the invention, there is provided a method for automatically setting a configuration in a home base station, including: retrieving wireless setting information of a neighbor base station and a neighbor home base station through a communication interface for a terminal operation when updated wireless setting information is not received from a network apparatus; transmitting the retrieved wireless setting information to the network apparatus; and performing an operation by reflecting a last wireless setting information when the last wireless setting information is received from the network apparatus.

According to a second aspect of the invention, there is provided an apparatus for automatically setting a configuration in a home base station, including: a communication interface for a terminal operation; and a controller for retrieving wireless setting information of a neighbor base station and a neighbor home base station through the communication interface for the terminal operation when updated wireless setting information is not received from a network apparatus, transmitting the retrieved wireless setting information to the network apparatus, and performing an operation by reflecting last wireless setting information when the last wireless setting information is received from the network apparatus.

According to a third aspect of the invention, there is provided a communication system for automatically setting a configuration, including: a home base station for retrieving wireless setting information of a neighbor base station and a neighbor home base station through a communication interface for a terminal operation when updated wireless setting information is not received from a network apparatus, transmitting the retrieved wireless setting information to the network apparatus, and performing an operation by reflecting last wireless setting information when the last wireless setting information is received from the network apparatus; and the network apparatus for receiving wireless setting information retrieved from the home base station when there is no wireless setting information updated for the home base station, generating a last setting information to be used in the home base station on a basis of the retrieved wireless setting information, and transmitting the last wireless setting information to the home base station.

As described above, an apparatus and method for automatically setting a configuration in a home base station according to the present invention are advantageous in that the configuration can be automatically set by monitoring an environment of a neighbor base station without a direct operation by an engineer, transmitting a monitoring result to a server, and receiving FA information and PN code information from the server.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EXEMPLARY EMBODIMENTS

An apparatus and method for automatically setting a configuration in a home base station according to the present invention will now be described more fully hereinafter with reference to the accompanying drawings, in which exemplary embodiments thereof are shown. It will be understood by those skilled in the art that a system configuration in the following description is illustrative for explanation of the present invention and the invention is not limited thereto.

The present invention can acquire FA information and PN code (or unique code) information by adding hardware for performing a terminal reception function to a home base station structure.

In a process for searching a neighbor base station and a neighbor home base station, the home base station can use a mode 1 for simply acquiring FA information and PN codes and a mode 2 for acquiring detailed neighbor base station information. This will be described below in detail.

In the mode 1, the home base station retrieves FA information and PN codes of the neighbor base station and the neighbor home base station and transmits a retrieval result to a server.

The server can have a database for setting information of the neighbor base station or neighbor home base station.

The server can have a database for setting information of the home base station.

The server receives the FA information and PN codes of the neighbor base station and the neighbor home base station transmitted from the home base station, determines FA information and a PN code to be used in the home base station on the basis of the FA information and the PN codes, and transmits the FA information and the PN code to the home base station.

In the mode 2, the home base station retrieves only the FA information and the PN codes of the neighbor base station and the neighbor home base station, additionally acquires system information block (SIB) information within a primary common control physical channel (P-CCPCH), and transmits the information to the server. The server can have a database for setting information of the neighbor base station or neighbor home base station.

The server determines the FA information and the PN code to be used in the home base station on the basis of the FA information and the PN codes of the neighbor base station and the neighbor home base station and the SIB information within the P-CCPCH transmitted from the home base station, and transmits a determination result to the home base station.

The server assigns the non-overlapping FA information and PN code available in the home base station among resources assigned to the home base station to the home base station.

The server can assign the FA information and the PN code available in the home base station to the home base station by considering the received signal strength.

Figure 1:
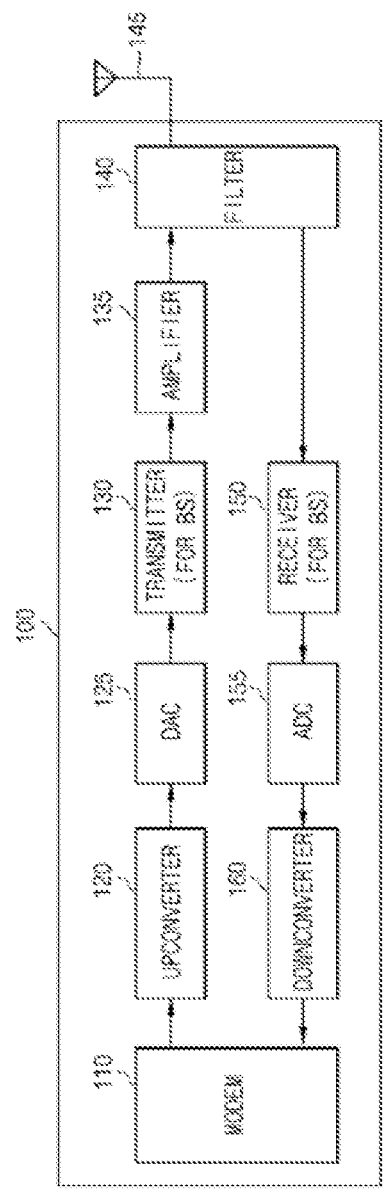
FIG. 1 is a block diagram illustrating a communication interface of a conventional home base station.
Figure 2:
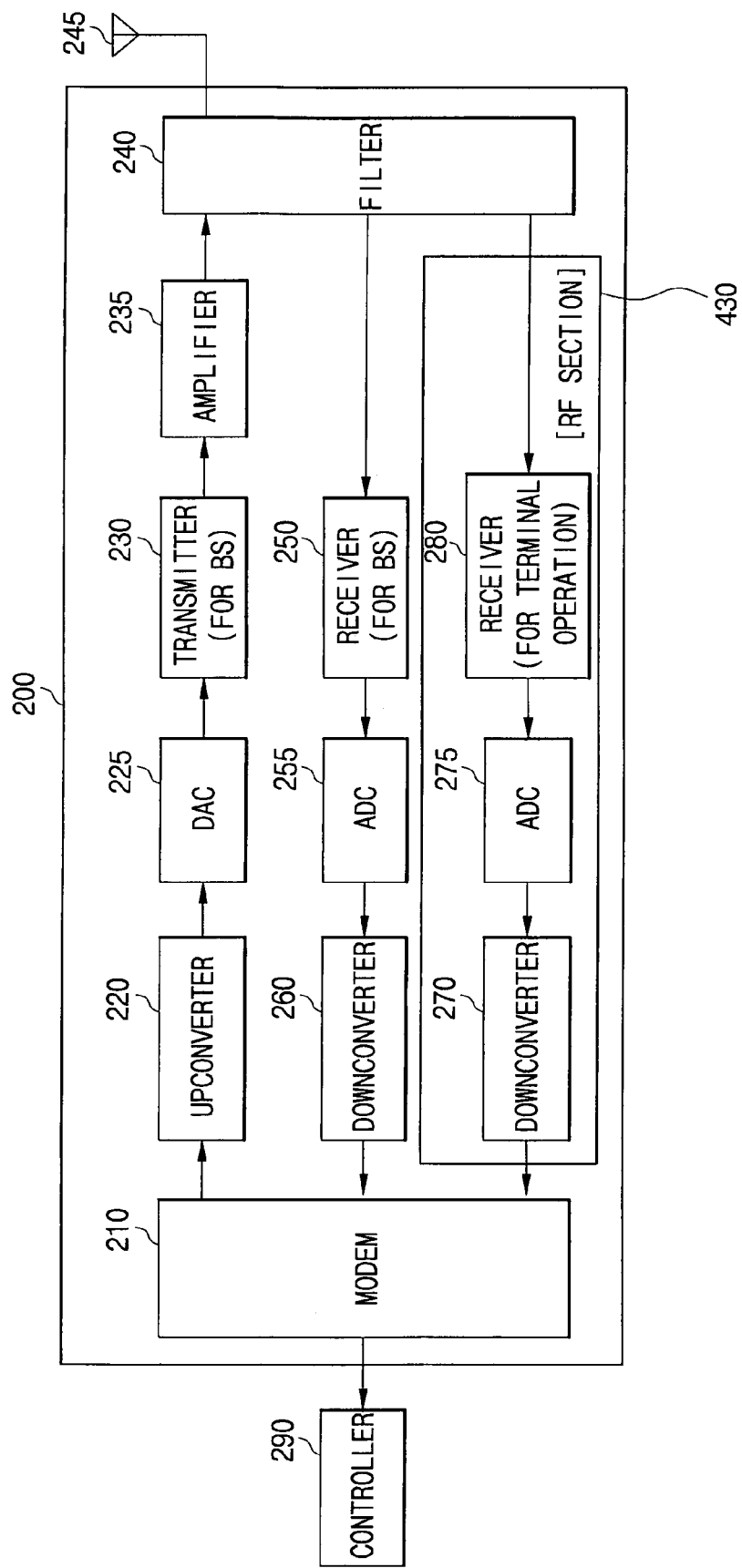
FIG. 2 is a block diagram illustrating a communication interface of a home base station according to an exemplary embodiment of the present invention.

FIG. 2 is a block diagram illustrating a communication interface of a home base station according to an exemplary embodiment of the present invention.

As illustrated in FIG. 2, a communication interface module 200 of the home base station includes a modem 210, an upconverter 220, a DAC 225, a transmitter 230, an amplifier 235, a filter 240, an antenna 245, a downconverter 260, an ADC 255, and a receiver 250. These functions are the same as the conventional functions and are used for an operation of the home base station.

Additionally, the communication interface 200 of the home base station of the present invention further includes a downconverter 270 for a terminal operation, an ADC 275, a receiver 280, and a controller 290.

The downconverter 270, the ADC 275, and the receiver 280 are the same structures as a reception section of a terminal, receive the same signal as a signal received by the terminal, and process the signal as in a processing scheme of the terminal.

In terms of the modem 210, a modem for the home base station and a modem for the terminal can be embedded into one integrated circuit and can be provided separately from each other. That is, the communication interface 200 additionally includes a communication block for the terminal operation other than a block for the home base station operation.

In addition to a function for controlling primary functions of the base station such as voice communication and data communication, the controller 290 acquires FA information and a PN code of the neighbor base station using the communication interface blocks 210, 270, 275, 280 for the terminal and reports the acquired FA information and PN code to the server according to the present invention (Mode 1). Thereafter, the FA information and the PN code to be used are acquired from the server and an operation based thereon is performed.

Alternatively, the controller 290 includes the FA information and the PN code and additionally acquires the SIB information within the P-CCPCH, such that they can be transmitted to the server (Mode 2). Thereafter, the FA information and the PN code to be finally used are acquired from the server and an operation based thereon is performed.

Figure 3:
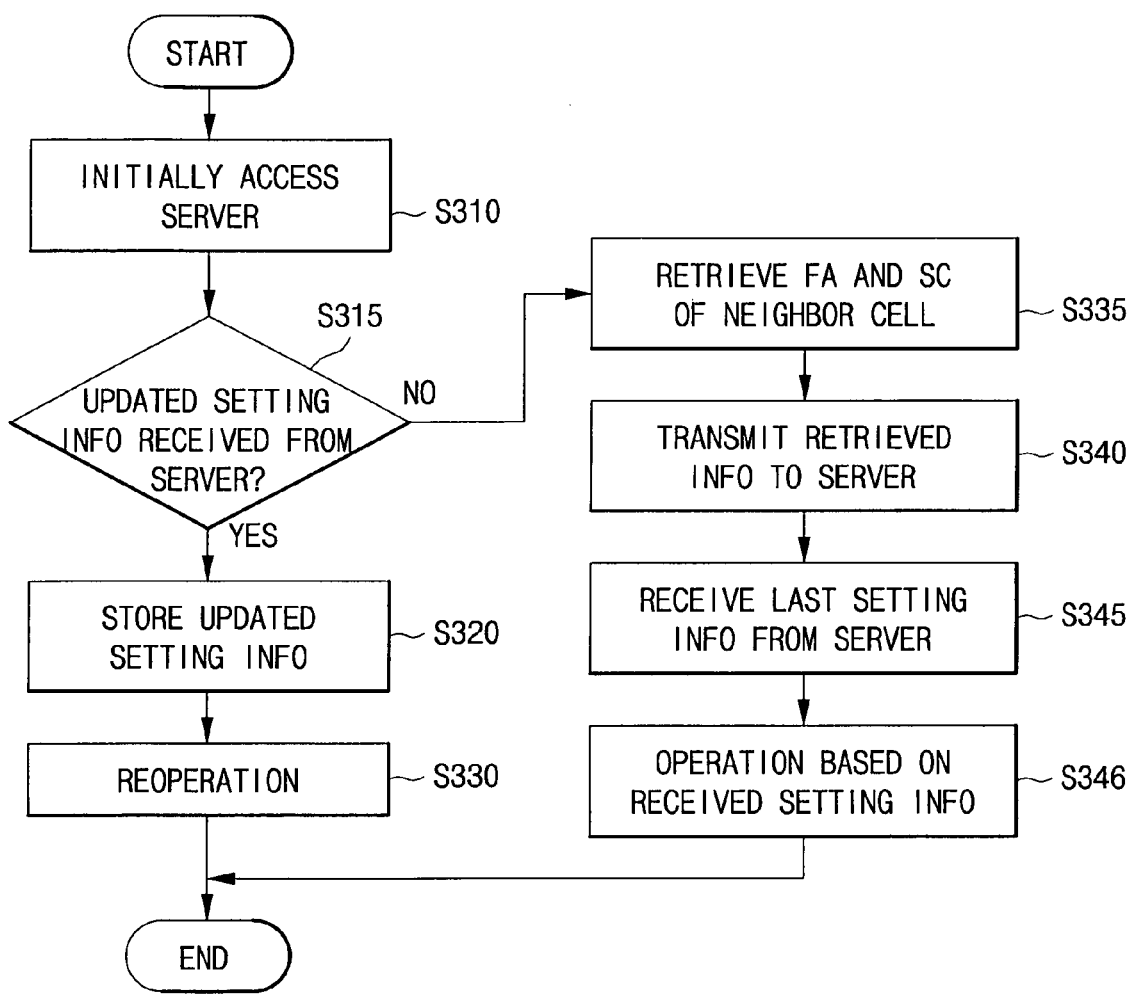
FIG. 3 is a flowchart illustrating an automatic setting process of the home base station according to an exemplary embodiment of the present invention.

FIG. 3 is a flowchart illustrating an automatic setting step of the home base station according to an exemplary embodiment of the present invention.

Referring to FIG. 3, the home base station accesses the server at the time of an initial operation (S310).

Thereafter, when updated setting information (of the FA information and the PN code) is received from the server (S315), the updated setting information is stored (S320) and a reoperation is performed (S330).

When the updated setting information (of the FA information and the PN code) is not received from the server (S315), the FA information and the PN code of a neighbor base station is retrieved (Mode 1) (S335).

Thereafter, the retrieved FA information and the retrieved PN code are transmitted to the server (S340), the last setting information from the server, that is, the FA information and the PN code to be used in the home base station, are received (S345), and the operation is performed on the basis of the received setting information (S346).

The home base station includes the FA information and the PN code and additionally acquires the SIB information within the P-CCPCH, such that they can be transmitted to the server (Mode 2).

Thereafter, the algorithm according to the present invention ends.

Figure 4:
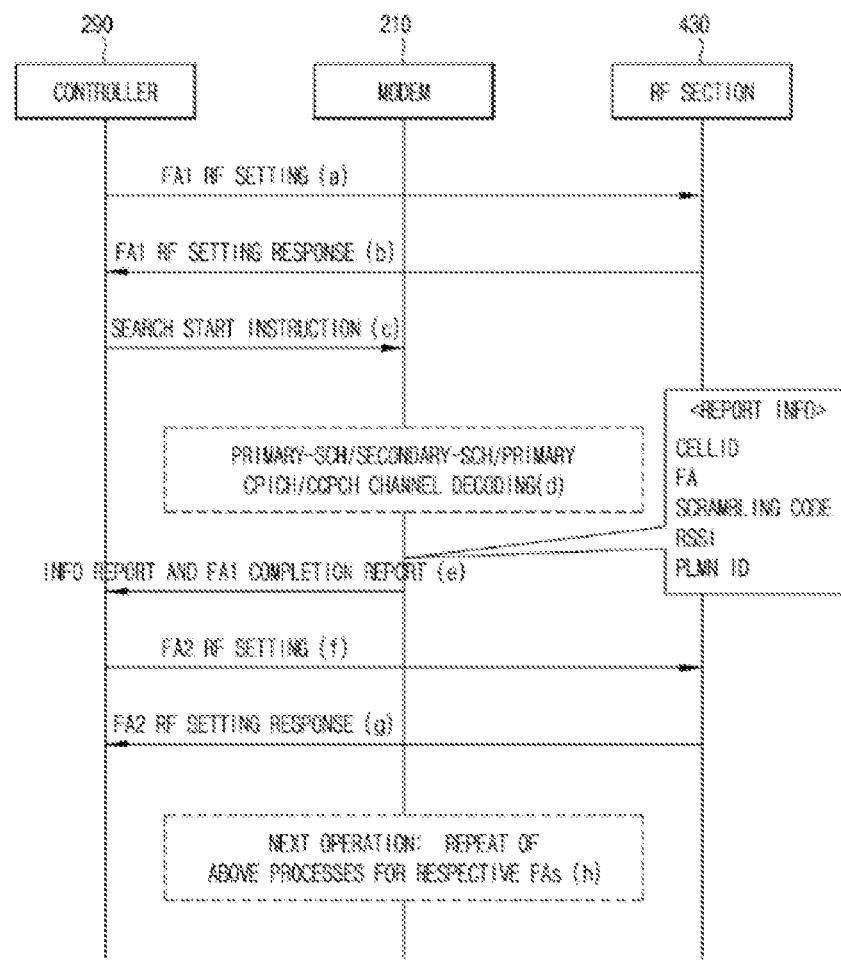
FIG. 4 is a message flow diagram illustrating a process for retrieving setting information of a neighbor base station and a neighbor home base station in the home base station according to an exemplary embodiment of the present invention.

FIG. 4 is a message flow diagram illustrating a step of retrieving setting information of a neighbor base station and a neighbor home base station in the home base station according to an exemplary embodiment of the present invention.

As shown in FIG. 4, the controller 290 instructs an RF section 430 to set a frequency for retrieving setting information of the neighbor base station to an FAI band. The RF section 430 indicates the blocks 270, 275, 280 for the terminal operation, as shown in FIG. 2 (Step a).

Thereafter, when receiving a response indicating that settings are completed from the RF section 430 (Step b), the controller 290 instructs the modem 210 to search the neighbor base station and the neighbor home base station (Step c).

The modem 210 starts to search the neighbor base station and the neighbor home base station (Step d).

In search steps, the modem 210 acquires the FA information and the PN codes by searching a primary-synchronization channel (SCH)/secondary-SCH/common pilot channel (CPICH) of the neighbor base station and the neighbor home base station, or additionally acquires information regarding a received signal strength indication, a public land mobile network (PLMN) ID, a cell ID, and the like of the neighbor base station and the neighbor home base station in the SIB information of the P-CCPCH (Mode 2), thereby reporting the information to the controller 290 (Step e).

The search steps (steps a to e) are repeated in respective frequencies (of FA2, FA3,) (Steps f, g, h).

Figure 5:
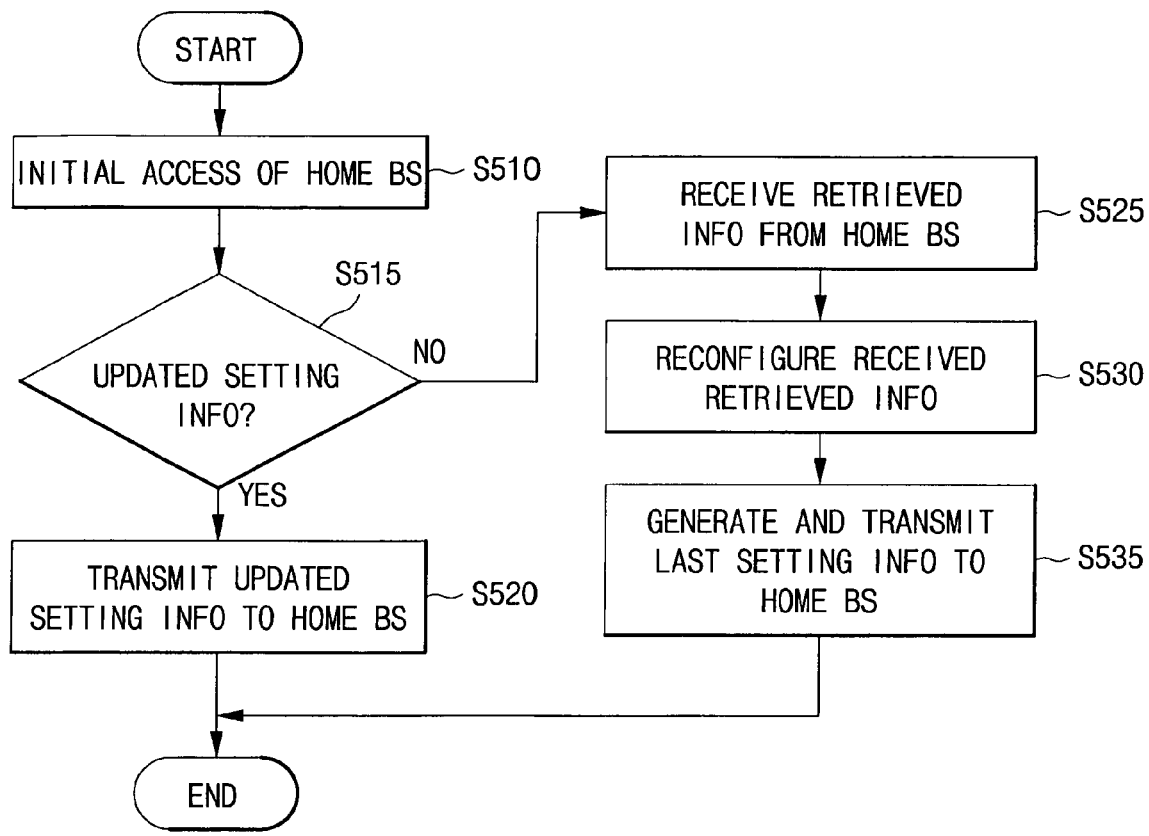
FIG. 5 is a flowchart illustrating a setting information assignment step of a server according to an exemplary embodiment of the present invention.

FIG. 5 is a flowchart illustrating a setting information assignment step of the server according to an exemplary embodiment of the present invention.

Referring to FIG. 5, after the home base station accesses the server at the time of an initial operation (S510), the server transmits updated setting information to the home base station (S520) when there is the updated setting information for the home base station (S515).

When there is no updated setting information for the home base station (S515), information retrieved from the home base station is received (S525).

The server can receive only FA information and a PN code of the neighbor base station (Mode 1), or can include the FA information and the PN code and additionally acquire SIB information within a P-CCPCH. The SIB information is a received signal strength indication, a PLMN ID, a cell ID, and the like of the neighbor base station and the neighbor home base station.

Thereafter, the server reconfigures the received retrieved wireless setting information (S530), and generates the last setting information for the home base station to transmit the generated information to the home base station (S535).

Figure 6A:
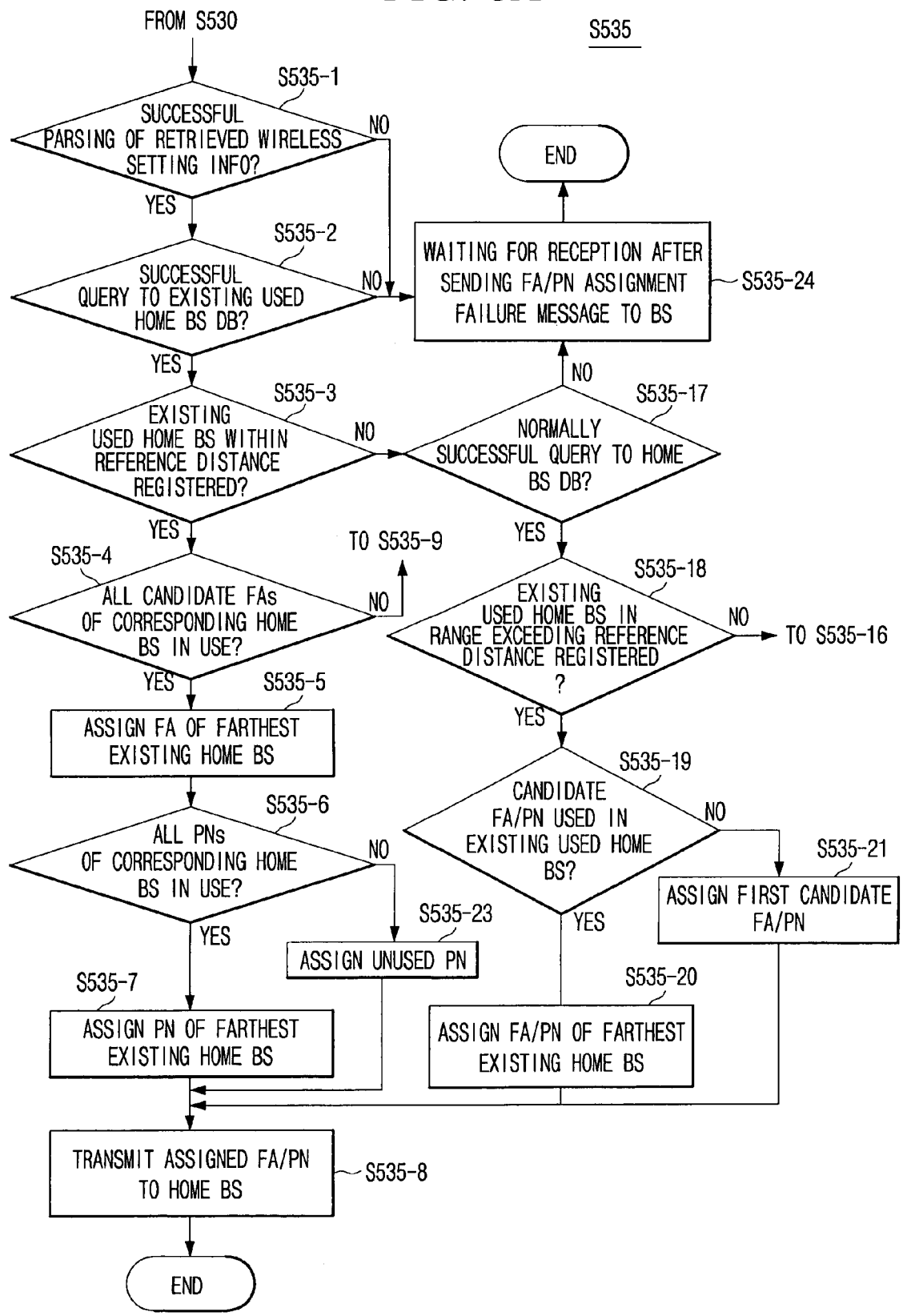
FIGS. 6A and 6B are a flowchart illustrating a setting information generation step in the setting information assignment step of the server according to FIG. 5.
Figure 6B:
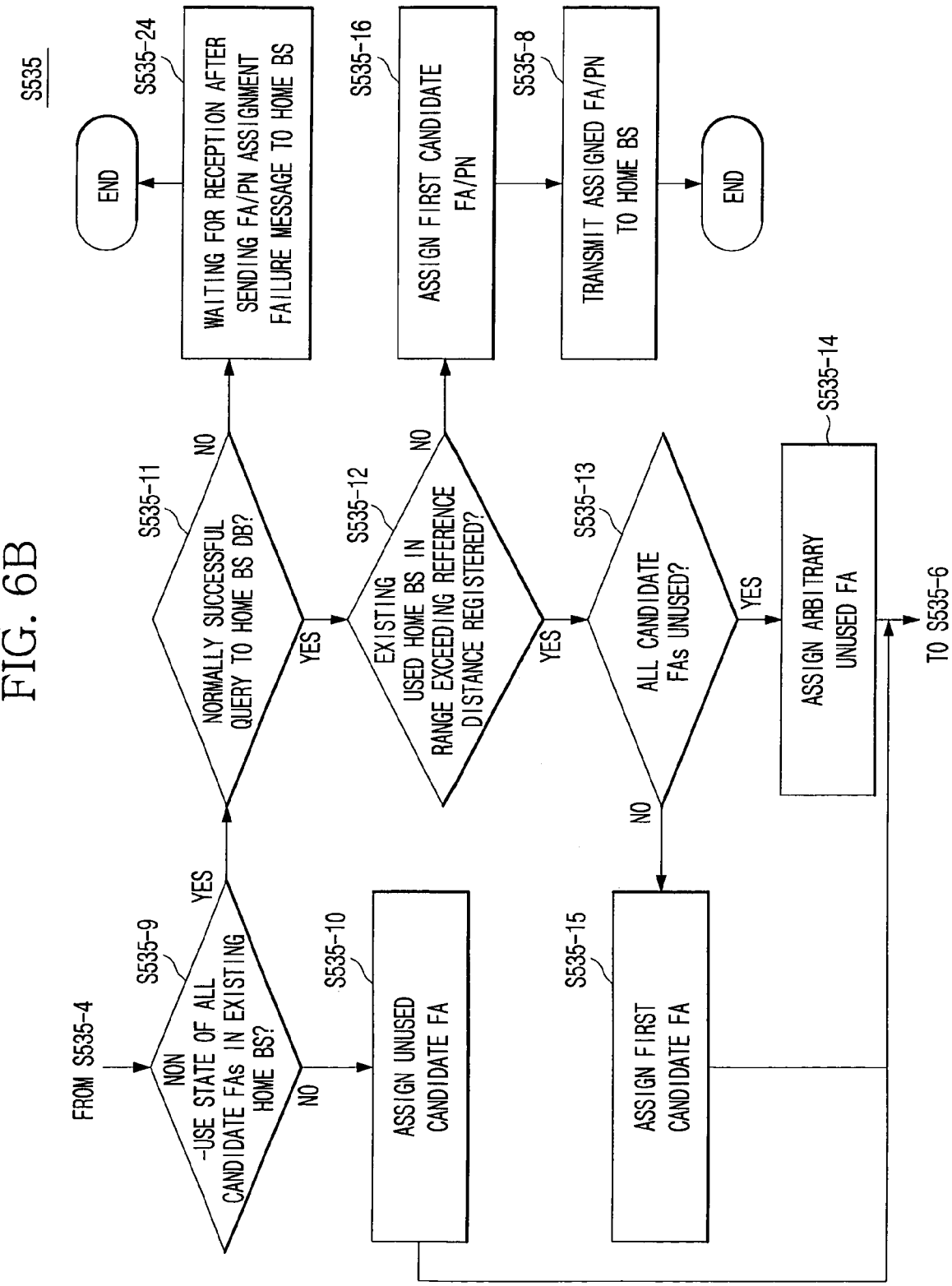

Next, the step of generating the last setting information to be used by the home base station will be described in detail with reference to FIGS. 6A and 6B.

First, it is determined whether the retrieved wireless setting information is successfully parsed (S535-1).

When the retrieved wireless setting information is unsuccessfully parsed (NO) in the parsing determination step (S535-1), an FA/PN assignment failure message is transmitted to the home base station and a waiting operation for reception is performed (S535-24). On the other hand, when parsing succeeds (YES), it is determined whether a query to a home base station database (DB) is successfully performed (S535-2).

When the query to the home base station DB is unsuccessfully performed (NO) in the step of determining whether the query to the home base station DB is successfully performed (S535-2), an FA/PN assignment failure message is transmitted to the home base station and a waiting operation for reception is performed (S535-24). On the other hand, when the query is successfully performed (YES), it is determined whether the existing used home base station within a reference distance is registered (S535-3).

On the other hand, when the existing used home base station within the reference distance is registered (YES) in the step of determining whether the existing used home base station within the reference distance is registered (S535-3), it is determined whether all candidate FAs of the existing used home base station within the reference distance are used (S535-4).

At this time, when all the candidate FAs are used (YES) in the step of determining whether all the candidate FAs are used (S535-4), an FA of a farthest existing home base station is assigned (S535-5).

Subsequently, it is determined whether all candidate PNs are used in the existing home base station (S535-6). At this time, when all the candidate PNs are used in the existing home base station (YES) in the step of determining whether all the candidate PNs are used in the existing home base station (S535-6), a PN of a farthest existing home base station is assigned (S535-7). Thereafter, the assigned FA/PN is transmitted to the home base station (S535-8).

On the other hand, when all the candidate FAs are not used in the home base station (NO) in the step of determining whether all the candidate FAs are used (S535-4), it is determined whether all the candidate FAs are in a non-use state in the existing home base station (S535-9).

At this time, when at least one FA of all the candidate FAs is used (NO) in the step of determining whether all the candidate FAs are in the non-use state in the existing home base station (S535-9), an unused candidate FA is assigned (S535-10) and then the step of determining whether all the candidate PNs are used (S535-6) is performed.

When all the candidate FAs are in the non-use state (YES) in the step of determining whether all the candidate FAs are in the non-use state in the existing used home base station (S535-9), it is determined whether the query to the home base station DB normally succeeds to determine whether the existing used home base station in a range exceeding the reference distance is registered (S535-11).

At this time, when the query normally succeeds (YES) in the step of determining whether the query normally succeeds (S535-11), it is determined whether the existing used home base station in the range exceeding the reference distance is registered (S535-12).

When the existing used home base station in the range exceeding the reference distance is registered (YES) in the step of determining whether the existing used home base station in the range exceeding the reference distance is registered (S535-12), it is determined whether all the candidate FAs are in the non-use state (S535-13).

When all the candidate FAs are not in the non-use state (NO), in the step of determining whether all the candidate FAs are in the non-use state (S535-13), an arbitrary unused FA is assigned (S535-14). When all the candidate FAs are in the non-use state (YES), a first candidate FA is assigned (S535-15).

On the other hand, when the existing used home base station in the range exceeding the reference distance is not registered (NO) in the step of determining whether the existing used home base station in the range exceeding the reference distance is registered (S535-12), a first candidate FA/PN is assigned (S535-16).

When the existing used home base station within the reference distance is not registered (NO) in the step of determining whether the existing used home base station within the reference distance is registered (S535-3), it is determined whether the query to the home base station DB normally succeeds to determine whether the existing used home base station in the range exceeding the reference distance is registered (S535-17).

When the query does not normally succeed (NO) in the step of determining whether the query normally succeeds (S535-17), an FA/PN assignment failure message is transmitted to the home base station and simultaneously awaiting operation for reception is performed (S535-23). On the other hand, when the query normally succeeds (YES), it is determined whether the existing used home base station in the range exceeding the reference distance is registered (S535-18).

When the existing used home base station in the range exceeding the reference distance is registered (YES), in the step of determining whether the existing used home base station in the range exceeding the reference distance is registered (S535-18), it is determined whether a corresponding candidate FA/PN is used in the existing used home base station (S535-19).

When the corresponding candidate FA/PN is used in the existing used home base station (YES), in the step of determining whether the corresponding candidate FA/PN is used in the existing used home base station (S535-19), an FA/PN of a closest existing home base station is assigned (S535-20).

When the corresponding candidate FA/PN is not used in the existing used home base station (NO), in the step of determining whether the corresponding candidate FA/PN is used in the existing used home base station (S535-19), a first candidate FA/PN is assigned (S535-21).

When the existing used home base station in the range exceeding the reference distance is not registered (NO), in the step of determining whether the existing used home base station in the range exceeding the reference distance is registered (S535-18), a first candidate FA/PN is assigned (S535-22).

When all the candidate PNs are not used in the existing home base station (NO) in the step of determining whether all the candidate PNs are used in the existing home base station (S535-6), an unused PN is assigned (S535-23).

When the query does not normally succeed (NO) in the step of determining whether the query normally succeeds (S535-11), an FA/PN assignment failure message is transmitted to the corresponding home base station (S535-24).

The server assigns the non-overlapping FA information and PN code available in the home base station among resources assigned to the home base station.

Criteria of determining the last setting information in the server are determined by an operation provider and differ according to situations of the operation provider, but are based on the operation efficiency of the provider and the operation state. The server can assign the FA information and the PN code to be used in the home base station to the home base station by considering the received signal strength.

A frequency and code manager 640 can have a database of setting information of the neighbor base station or neighbor home base station.

Thereafter, the algorithm according to the present invention ends.

Figure 7:
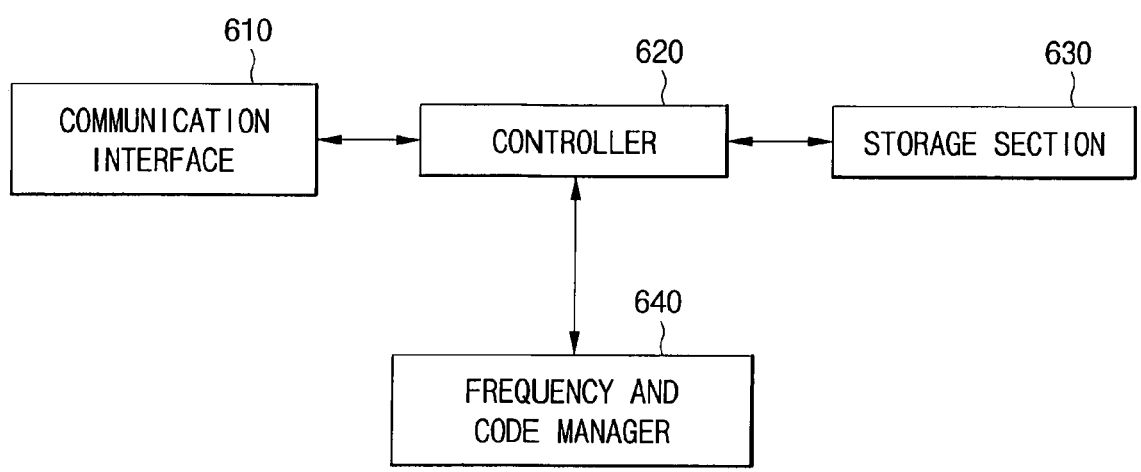
FIG. 7 is a block diagram illustrating the server according to an exemplary embodiment of the present invention.

FIG. 7 is a block diagram illustrating the server according to an exemplary embodiment of the present invention.

Referring to FIG. 7, the server is configured with a communication interface 610, a controller 620, a storage section 630, and the frequency and code manager 640.

The communication interface 610 is a module for communicating with other nodes, and includes a wired processor, a baseband processor, and the like. The wired processor converts a signal received through a wired path into a baseband signal and provides the baseband signal to the baseband processor. The wired processor converts a baseband signal from the baseband processor into a wired signal such that the baseband signal can be transmitted on an actual wired path, and transmits the wired signal through the wired path.

The controller 620 controls the overall operation of the server. Moreover, the frequency and code manager 640 is controlled according to the present invention.

When there is updated setting information for the home base station after the home base station accesses the server at the time of an initial operation, the frequency and code manager 640 transmits the updated setting information to the home base station. When there is no updated setting information for the home base station, information retrieved from the home base station is received.

The frequency and code manager 640 can receive only the FA information and the PN code of the neighbor base station from the home base station (Mode 1). Alternatively, the frequency and code manager 640 can include the FA information and the PN code and additionally acquire SIB information within the P-CCPCH. The SIB information includes a received signal strength indication, a PLMN ID, a cell ID, and the like for the neighbor base station and the neighbor home base station.

The frequency and code manager 640 reconfigures the received retrieved information, and generates the last setting information for the home base station to transmit the generated information to the home base station.

The frequency and code manager 640 assigns the non-overlapping FA information and PN code available in the home base station among resources assigned to the home base station. Criteria for determining the last setting information in the frequency and code manager 640 are determined by an operation provider and differ according to situations of the operation provider, but are based on the operation efficiency of the provider and the operation state. The frequency and code manager 640 can assign the FA information and the PN code to be used in the home base station to the home base station by considering the received signal strength.

The storage section 630 performs a function for storing a program for controlling the overall operation of the apparatus and storing temporary data occurring at the time of executing the program. The frequency and code manager 640 can use the storage section 630 for a database of setting information of the neighbor base station or the neighbor home base station.

In the above-described block configuration, the controller 620 performs a function of the frequency and code manager 640. The controller 620 and the frequency and code manager 640 are separately configured and illustrated to separately explain their functions in the present invention.

Accordingly, when an actual product is implemented, all functions of the frequency and code manager 640 can be configured to be processed in the controller 620 or a part of the functions can be configured to be processed in the controller 620.

While the present invention has been shown and described in connection with the preferred embodiments, it will be apparent to those skilled in the art that modifications and variations can be made without departing from the spirit and scope of the invention as defined by the appended claims.

What is claimed is:

1. A method for automatically setting a configuration in a home base station, the method comprising:
   determining whether updated wireless setting information has been received from a network apparatus;
   in response to determining that the updated wireless setting information has not been received from the network apparatus, performing a wireless setting process comprising:
   retrieving wireless setting information of a neighbor base station and a neighbor home base station through a communication interface for a terminal operation;
   transmitting the retrieved wireless setting information to the network apparatus;
   receiving, from the network apparatus, last wireless setting information; and
   performing, in response to receiving the last wireless setting information, an operation based on the last wireless setting information,
   in response to determining that the updated wireless setting information has been received from the network apparatus, storing the updated wireless setting information and performing a reoperation based on the updated wireless setting information.

2. The method according to claim 1, wherein the wireless setting information is a frequency assignment information and an unique code information of the neighbor base station and the neighbor home base station.

3. The method according to claim 1, wherein the wireless setting information is a frequency assignment information, an unique code information, and a system information of the neighbor base station and the neighbor home base station.

4. The method according to claim 1, wherein the last wireless setting information is frequency assignment information and the unique code information to be used in the home base station.

5. An apparatus for automatically setting a configuration in a home base station, the apparatus comprising:
   a communication interface for a terminal operation; and
   a controller:
   configured to determine whether updated wireless setting information has been received from a network apparatus;
   in response to determining that the updated wireless setting information has not been received from the network apparatus, configured to cause, at least in part, wireless setting information of a neighbor base station and a neighbor home base station to be retrieved via the communication interface for the terminal operation, configured to cause, at least in part, the retrieved wireless setting information to be transmitted to the network apparatus via the communication interface, configured to cause, at least in part, last wireless setting information to be received from the network apparatus via the communication interface, and configured to perform, in response to receiving the last wireless setting information, an operation based on the last wireless setting information; and
   in response to determining that the updated wireless setting information has been received from the network apparatus, configured to store the updated wireless setting information and perform a reoperation based on the updated wireless setting information.

6. The apparatus according to claim 5, wherein the wireless setting information is a frequency assignment information and an unique code information of the neighbor base station and the neighbor home base station.

7. The apparatus according to claim 5, wherein the wireless setting information is a frequency assignment information, an unique code information, and a system information of the neighbor base station and the neighbor home base station.

8. The apparatus according to claim 5, wherein the last wireless setting information is a frequency assignment information and an unique code information to be used in the home base station.

9. A control method of a network apparatus for providing automatic configuration setting information, the method comprising:
   determining whether there is updated wireless setting information for a home base station that accesses the network apparatus;
   in response to determining that there is not updated wireless setting information for the home base station, performing a wireless setting process comprising:
   receiving wireless setting information from the home base station;
   generating, based on the received wireless setting information, last wireless setting information to be used by the home base station; and
   transmitting the last wireless setting information to the home base station,
   in response to determining that there is updated wireless setting information for the home base station, transmitting the updated wireless setting information to the home base station.

10. The control method according to claim 9, wherein generating the last wireless setting information to be used by the home base station comprises:
    determining whether the wireless setting information received from the home base station is successfully parsed;
    transmitting a first FA/PN assignment failure message to the home base station if the wireless setting information is unsuccessfully parsed;
    waiting, in response to transmitting the first FA/PN assignment failure message, for reception of the wireless setting information;
    determining, if the wireless setting information is successfully parsed, whether a query to a home base station database (DB) is successfully performed;
    transmitting a second FA/PN assignment failure message to the home base station if the query is unsuccessfully performed;
    waiting, in response to transmitting the second FA/PN assignment failure message, for reception of the wireless setting information;
    determining, if the query is successfully performed, whether an existing used home base station within a reference distance is registered;
    determining, if the existing used home based station within the reference distance is registered, whether all candidate FAs of the existing used home base station within the reference distance are used;

assigning, if all the candidate FAs are used, an FA of a farthest existing home base station;

determining whether all candidate PNs are used in the existing home base station; and assigning, if all candidate PNs are used, a PN of a farthest existing home base station.

11. The control method according to claim 10, further comprising:

determining whether all the candidate FAs are in a non-use state when all the candidate FAs are not used upon determining whether all the candidate FAs are used; and determining whether all the candidate PNs are used after assigning an unused candidate FA when at least one FA of all the candidate FAs is used upon determining whether all the candidate FAs are in the non-use state.

12. The control method according to claim 11, further comprising:

determining whether the query to the home base station DB normally succeeds to determine whether the existing used home base station in a range exceeding the reference distance is registered when all the candidate FAs are in the non-use state upon determining whether all the candidate FAs are in the non-use state in the existing used home base station;

determining whether the existing used home base station in the range exceeding the reference distance is registered when the query normally succeeds upon determining whether the query normally succeeds;

determining whether all the candidate FAs are in the non-use state when the existing used home base station in the range exceeding the reference distance is registered upon determining whether the existing used home base station in the range exceeding the reference distance is registered; and assigning an arbitrary unused FA when all the candidate FAs are not in the non-use state upon determining whether all the candidate FAs are in the non-use state, and assigning a first candidate FA when all the candidate FAs are not used.

13. The control method according to claim 10, further comprising:

assigning a first candidate FA/PN when the existing used home base station in a range exceeding the reference distance is not registered upon determining whether the existing used home base station in the range exceeding the reference distance is registered.

14. The control method according to claim 10, further comprising:

determining whether the query to the home base station DB normally succeeds to determine whether the existing used home base station in a range exceeding the reference distance is registered when the existing used home base station within the reference distance is not registered upon determining whether the existing used home base station within the reference distance is registered;

transmitting a third FA/PN assignment failure message to the home base station;

waiting, in response to transmitting the third FA/PN assignment failure message, for reception of the wireless setting information;

determining, if the query normally succeeds, whether the existing used home base station in the range exceeding the reference distance is registered;

determining, if the existing used home base station in the range exceeding the reference distance is registered, whether a corresponding candidate FA/PN is used in the existing used home base station; and assigning, if the corresponding candidate FA/PN is used in the existing used home base station, an FA/PN of a closest existing home base station.

15. The control method according to claim 14, further comprising:

assigning a first candidate FA/PN when the corresponding candidate FA/PN is not used in the existing used home base station upon determining whether the corresponding candidate FA/PN is used in the existing used home base station.

16. The control method according to claim 14, further comprising:

assigning a first candidate FA/PN when the existing used home base station in the range exceeding the reference distance is not registered upon determining whether the existing used home base station in the range exceeding the reference distance is registered.

17. The control method according to claim 9, further comprising:

transmitting the updated wireless setting information to the home base station when there is the updated wireless setting information for the home base station.

18. The control method according to claim 9, wherein the wireless setting information is a frequency assignment information and an unique code information of a neighbor base station and a neighbor home base station.

19. The control method according to claim 9, wherein the wireless setting information is a frequency assignment information, an unique code information, and system information of a neighbor base station and a neighbor home base station.

20. The method according to claim 9, wherein the last wireless setting information is a frequency assignment information and an unique code information to be used in the home base station.

21. A network apparatus for providing automatic configuration setting information, the network apparatus comprising:

a controller:
configured to determine whether there is updated wireless setting information for a home base station that accesses the network apparatus;

in response to determining that there is not updated wireless setting information for the home base station, configured to cause, at least in part, wireless setting information to be received from the home base station, configured to generate, based on received wireless setting information, last wireless setting information to be used by the home base station, and configured to cause, at least in part, the last wireless setting information to be transmitted to the home base station, in response to determining that there is updated wireless setting information for the home base station, configured to transmit the updated wireless setting information to the home base station; and a database for storing the updated wireless setting information, the received wireless setting information, and the last wireless setting information.

22. The network apparatus according to claim 21, wherein the wireless setting information is frequency assignment information and unique code information of a neighbor base station and a neighbor home base station.

23. The network apparatus according to claim 21, wherein the wireless setting information is frequency assignment information, unique code information, and system information of a neighbor base station and a neighbor home base station.

24. The network apparatus according to claim 21, wherein the last wireless setting information is a frequency assignment information and an unique code information to be used in the home base station.

25. The network apparatus according to claim 21, wherein the controller is further configured to generate the last wireless setting information to be used by the home base station based on the controller being further configure to:
   determine whether the wireless setting information received from the home base station is successfully parsed;
   cause, at least in part, a first FA/PN assignment failure message to be transmitted to the home base station if the wireless setting information is unsuccessfully parsed;
   wait, in response to causing, at least in part, the first FA/PN assignment failure message to be transmitted, for reception of the wireless setting information;
   determine, if the wireless setting information is successfully parsed, whether a query to a home base station database (DB) is successfully performed;
   cause, at least in part, a second FA/PN assignment failure message to be transmitted to the home base station if the query is unsuccessfully performed;
   wait, in response to causing, at least in part, the second FA/PN assignment failure message to be transmitted, for reception of the wireless setting information;
   determine, if the query is successfully performed, whether an existing used home base station within a reference distance is registered;
   determine, if the existing used home base station within the reference distance is registered, whether all candidate FAs of the existing used home base station within the reference distance are used;
   assign, if all the candidate Fas are used, an FA of a farthest existing home base station;
   determine whether all candidate PNs are used in the existing home base station; and
   assign, if all candidate PNs are used, a PN of a farthest existing home base station.

26. The network apparatus according to claim 25, wherein the controller is further configured to:
   determine whether all the candidate FAs are in a non-use state when all the candidate FAs are not used upon determining whether all the candidate FAs are used; and
   determine whether all the candidate PNs are used after assigning an unused candidate FA when at least one FA of all the candidate FAs is used upon determining whether all the candidate FAs are in the non-use state.

27. The network apparatus according to claim 26, wherein the controller is further configured to:
   determine whether the query to the home base station DB normally succeeds to determine whether the existing used home base station in a range exceeding the reference distance is registered when all the candidate FAs are in the non-use state upon determining whether all the candidate FAs are in the non-use state in the existing used home base station;
   determine whether the existing used home base station in the range exceeding the reference distance is registered when the query normally succeeds upon determining whether the query normally succeeds;
   determine whether all the candidate FAs are in the non-use state when the existing used home base station in the range exceeding the reference distance is registered upon determining whether the existing used home base station in the range exceeding the reference distance is registered; and
   assign an arbitrary unused FA when all the candidate FAs is not in the non-use state upon determining whether all the candidate FAs are in the non-use state, and assigning a first candidate FA when all the candidate FAs are not used.

28. The network apparatus according to claim 25, wherein the controller is further configured to:
   assign a first candidate FA/PN when the existing used home base station in the range exceeding the reference distance is not registered upon determining whether the existing used home base station in the range exceeding the reference distance is registered.

29. The network apparatus according to claim 25, wherein the controller is further configured to:
   determine whether the query to the home base station DB normally succeeds to determine whether the existing used home base station in a range exceeding the reference distance is registered when the existing used home base station within the reference distance is not registered upon determining whether the existing used home base station within the reference distance is registered;
   cause, at least in part, a third FA/PN assignment failure message to be transmitted to the home base station;
   wait, in response to causing, at least in part, the third FA/PN assignment failure message to be transmitted, for reception of the wireless setting information;
   determine, if the query normally succeeds, whether the existing used home base station in the range exceeding the reference distance is registered;
   determine, if the existing used home base station in the range exceeding the reference distance is registered, whether a corresponding candidate FA/PN is used in the existing used home base station; and
   assign, if the corresponding candidate FA/PN is used in the existing used home base station, an FA/PN of a closest existing home base station.

30. The network apparatus according to claim 29, wherein the controller is further configured to:
   assign a first candidate FA/PN when the corresponding candidate FA/PN is not used in the existing used home base station upon determining whether the corresponding candidate FA/PN is used in the existing used home base station.

31. The network apparatus according to claim 29, wherein the controller is further configured to:
   assign a first candidate FA/PN when the existing used home base station in the range exceeding the reference distance is not registered upon determining whether the existing used home base station in the range exceeding the reference distance is registered.

32. A communication system for automatically setting a configuration, the communication system comprising:
   a home base station:
      configured to determine whether updated wireless setting information has been received from a network apparatus;
      in response to determining that the updated wireless setting information has not been received from the network apparatus, configured to retrieve wireless setting information of a neighbor base station and a neighbor home base station through a communication interface for a terminal operation, configured to transmit the retrieved wireless setting information to the network apparatus, configured to receive, from the network apparatus, last wireless setting information, and configured to perform, in response to receiving the last wireless setting information, an operation based on the last wireless setting information; and in response to determining that the updated wireless setting information has been received from the network apparatus, configured to store the updated wireless setting information and perform a reoperation based on the updated wireless setting information; and the network apparatus configured to:
receive wireless setting information from the home base station,
generate, based on the received wireless setting information, last wireless setting information to be used by the home base station, and
transmit the last wireless setting information to the home base station.

33. The communication system according to claim 32, wherein the wireless setting information is a frequency assignment information and an unique code information of the neighbor base station and the neighbor home base station.

34. The communication system according to claim 32, wherein the wireless setting information is a frequency assignment information, an unique code information, and a system information of the neighbor base station and the neighbor home base station.

35. The communication system according to claim 32, wherein the last wireless setting information is a frequency assignment information and an unique code information to be used in the home base station.

* * * * *